United States Patent Office 3,759,764
Patented Sept. 18, 1973

3,759,764
COMPOSITE PROPELLANT CONTAINING
AZIRIDINYL CURING AGENT
James N. Short, Bartlesville, Okla., assignor to
Phillips Petroleum Company
No Drawing. Filed Nov. 20, 1961, Ser. No. 153,759
Int. Cl. C06d 5/06
U.S. Cl. 149—19       11 Claims This invention relates to a solid rocket propellant. In another aspect it relates to castable rocket propellant compositions having increased pot-life and to their method of preparation.

As disclosed in the copending application of P. S. Hudson and C. C. Bice, Ser. No. 829,462, filed July 24, 1959, now U.S. Pat. No. 3,087,844, new rocket propellant formulations have been developed suitable for casting to yield a product which has very desirable physical and burning properties. Unfortunately many of these formulations have an undesirably short "pot-life" which is the length of time that the formulation remains in the fluid state after the ingredients are fully mixed. "Pot-life" is defined as the time that lapses between the mixing of the propellant ingredients in a fluid condition and the attainment by the mixture of a viscosity of 5,000 poises when the mixture is maintained at a temperature of 160° F. In the manufacture of a rocket the propellant ingredients are thoroughly mixed and then poured into a suitable mold which in some instances may be the rocket case. The temperature of the filled mold is then raised and maintained at a suitably high temperature for a length of time required to produce a solid material with the desired properties. In order that the propellant grain have uniform properties and be free of cracks, voids and irregularities which would result in poor burning characteristics, it is desirable that the propellant mass remain completely fluid until the mold has been filled.

The length of time during which the composition must remain fluid depends upon a number of circumstances. For example, the time for mixing and filling the mold is directly dependent upon the size of the rocket. Also, it may be necessary for safety reasons to mix the propellant ingredients in one location and then transport the mixture some distance to the filling operation. While a pot-life of approximately sixty minutes has been generally acceptable in the past, present developments now require a pot-life of at least 70 minutes and preferably 100 to 150 minutes. It is quite possible that these requirements may increase even further in the future.

According to the present invention, I have discovered a method of increasing the pot-life of a castable propellant composition comprising an oxidant of inorganic oxidizing salts, a binder of synthetic polymer of vinylidene-containing monomer, said polymer containing at least one acid group per molecule, and a curative of aziridinyl compound. This is the type of propellant composition which is disclosed in the above-mentioned copending application of Hudson and Bice. According to my invention, the pot-life of the above-described propellant composition is extended by adding to the binder aniline or an alkyd derivative thereof. The material which can be used as a pot-life extender has the general formula:

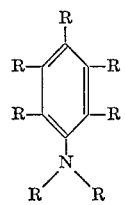

wherein each R is selected from the group consisting of hydrogen and lower alkyls. By lower alkyl, I mean alkyl groups having about 1 to 3 carbon atoms, such as methyl, ethyl, propyl and isopropyl. The composition thus formed is a fluid castable formulation which can be cured to form a solid propellant which also has improved physical properties in tensile strength and/or elongation.

It is an object of my invention to provide a method of increasing the pot-life of a castable propellant composition comprising an acid group-containing polymer and an aziridinyl curative. Another object of my invention is to provide an improved castable propellant composition which is curable to form a solid propellant and which has increased pot-life. Still another object is to provide a solid rocket propellant having improved physical properties in tensile strength and/or elongation. Other objects, advantages and features of my invention will be apparent to those skilled in the art from the following discussion.

Castable propellant compositions of this invention comprise an oxidant of inorganic oxidizing salt and a binder which is a liquid polymer of a vinylidene-containing monomer, said polymer containing at least 1 acid group per molecule, and a curative which is a polyfunctional aziridinyl compound. The inorganic oxidizing salts which are used are those commonly employed in forming solid propellants and include the ammonium, alkali metal, and alkaline earth metal salts of nitric, perchloric, and chloric acids and mixtures thereof, such as, sodium perchlorate, potassium perchlorate, magnesium perchlorate, ammonium perchlorate, lithium chlorate, ammonium chlorate, strontium chlorate, potassium nitrate, sodium nitrate, calcium nitrate, ammonium nitrate and the like.

Various other materials known in the art to form a part of solid propellant compositions can be included. For example, the propellant can contain a powdered metal such as aluminum, boron, magnesium, beryllium and the like, or alloys of metals such as the aluminum alloys of boron, magnesium, manganese or copper. As used here the term "metal" also applies to silicon. Other conventional ingredients include plasticizers, oxidation inhibitors, reinforcing agents, wetting agents, modifiers, vulcanizing agents, curing agents, accelerators, burning rate catalysts, and the like. Suitable burning rate catalysts include various ferrocyanides, copper chromite, ammonium dichromate, potassium dichromate, sodium dichromate, and the like. Various fillers, such as, carbon black or mineral fillers can be incorporated into the polymeric binder. In general the components of the solid propellant compositions are employed in the following relative amounts:

| Component: | Weight percent |
|---|---|
| Inorganic oxidizing salt | 75–90 |
| Acid polymer | 10–25 |
| Powdered metal | 0–25 |

In addition, the other conventional ingredients mentioned above may be present in small amounts, these proportions being well known.

Polymers which can be used to form the binder are liquid in their uncured state having molecular weights in the range of about 1,000 to about 20,000. These polymers can be prepared by various methods from conjugated dienes, various vinyl-substituted compounds such as vinyl-substituted aromatic compounds, acrylic or alkylacrylic acid esters, nitriles, N,N-disubstituted amides, vinylfuran or N-vinylcarbazole. The homopolymers of these monomers or the copolymers including block copolymers, of the monomers one with another can be employed. Also suitable are copolymers of these monomers with unsaturated carboxylic acids.

The preferred monomers are the conjugated dienes containing from 4 to 12 carbon atoms per molecule and preferably from 4 to 8 carbon atoms per molecule. Examples of these compounds include 1,3-butadiene, isoprene, 2,3-dimethyl-1,3-butadiene, piperyline, 1,3-hexadiene, 3-butyl-1,3-octadiene, phenyl-1,3-butadiene, 2-methyl-3-isopropyl-1,3-butadiene, and the like. Conjugated dienes containing halogen and alkoxy substituents along the chain such as chloroprene, fluoroprene, 2-methoxy-1,3-butadiene, and the like, can also be employed.

The vinyl-substituted aromatic compounds are exemplified by styrene, 1-vinyl-naphthalene, or 2-vinylnaphthalene and the alkyl, cycloalkyl, aryl, alkyaryl, aralkyl, alkoxy, and aryloxy derivatives thereof, in which the total number of carbon atoms in the combined substituents does not exceed 12. Other examples of these monomers include 3-methylstyrene, 3,5-diethylstyrene, 4-dodecylstyrene, 4-cyclohexylstyrene, 3,5-diphenylstyrene, 3,5-diphenoxystyrene, 6-isopropyl-1-vinylnaphthene, 7-dodecyl-2-vinylnaphthalene, 6-benzyl-2-vinylnaphthalene, 4-o-tolyl-2-vinylnaphthalene, and the like.

Examples of acrylic and alkacrylic acid esters include butyl acrylate, methylacrylate, ethylacrylate, methyl methacrylate, ethyl methacrylate, propyl methacrylate, propyl ethacrylate, butyl methacrylate, methyl ethacrylate, ethyl ethacrylate, isopropyl ethacrylate, and the like. Examples of suitable nitriles are acrylonitrile, methacrylonitrile and the like. Examples of suitable N,N-disubstituted amides are N,N-dimethylacrylamide, N,N-diethylmethacrylamide, and the like.

One method of preparing polymers containing terminal acid groups from the above-described monomers is by contacting the monomers with an organo alkali metal compound and subsequently replacing the alkali metal in the polymer which is formed with an acid group. The organo alkali metal compounds used to initiate such polymerizations contain at least 1 and preferably 2 to 4 alkali metal atoms, lithium being the preferred alkali metal. These initiators can be prepared in several ways such as by replacing halogens in an organic halide with an alkali metal, by direct addition of alkali metals to a double bond, or by reacting an organic halide with a suitable alkali metal compound. The alkali metals, of course, include sodium, potassium, lithium, rubidium and cesium.

The organic radical of the organo alkali metal compounds can be aliphatic, cycloaliphatic or aromatic. Examples of suitable initiators include n-butyllithium, phenyllithium, cyclohexyllithium, 1,4-disodio-2-methylbutane, 1,15-dipotassiopentadecane, 1,20-dilithioeicosane, dilithionaphthalene, 4,4'-dilithiobiphenyl, 1,4-dilithiocyclohexane, and the like. Some of these initiators give better results than others in preparing terminally reactive polymers. A preferred initiator is 1,2-dilithio-1,2-diphenylethane. Also preferred are the dilithium adducts of 2,3-dimethyl-1,3-butadiene, 1,3-butadiene, or isoprene, wherein the adduct contains from 1-7 diene units per molecule and dilithium naphthalene-isoprene-butadiene adducts. The lithium compounds should be soluble in the polymerization diluent.

These organo alkali metal initiators are ordinarily prepared in ether solvents such as diethyl ether, but the polymerization should be carried out in a hydrocarbon diluent. Usually the amount of initiator employed is between about 0.25 and 100 millimoles per 100 grams of monomer. The amount of initiator can be used to regulate the molecular weight of the recovered polymer. The temperature of the polymerization is ordinarily in the range between —100 and +150° C. and the diluent is generally a paraffin, cycloparaffin or aromatic containing from 4 to 10 carbon atoms per molecule such as benzene, toluene, cyclohexane, xylene, n-butane, isooctane, n-decane and the like.

Polymers thus prepared contain an alkali metal atom on at least one end and preferably on each end of the polymer. These alkali metal atoms can be replaced by treating the polymer with suitable reagents such as carbon dioxide, sulfuryl chloride, or the like and hydrolyzing to provide polymers containing terminal acid groups. The acid groups most frequently used are those of the solid elements of Groups IV–B, V–B and VI–B of the Periodic Table. (Henry D. Tubbard, 1956 edition, revised by William F. Meggers, National Bureau of Standards.) Examples of such acid groups include POOH, SOH, $SO_2H$, $SO_3H$, COOH, $SeO_2H$, $SeO_3H$, $SiO_2H$, $SnO_2H$, $SbO_2H$, SbOH, $SbO_3H_2$, $TeO_2H$, $TeO_3H$, $AsO_2H$, AsOH, $AsO_3H_2$, $AsO_3H_3$. The amount of acid forming reagent used is preferably in excess of stoichiometric and the temperature can vary over a wide range, for example, from —75 to +75° C.

Polymers containing acid groups can also be prepared by copolymerizing the aforementioned monomers with unsaturated carboxylic acids containing up to 36 carbon atoms, from 1 to 4 double bonds and 1 or 2 carboxy groups. Also included are the so called "dimerized" acids, i.e., where 2 molecules of an acid are linked by destroying one of the double bonds. Examples of suitable acids include acrylic acid, methacrylic acid, itaconic acid, vinylacetic acid, palmitoleic acid, oleic acid, ricinoleic acid, arachidonic acid, erucic acid, selacholeic acid, fumaric acid, maleic acid, linoleic acid, and linolenic acid. Reaction of the monomer with the unsaturated carboxylic acid can be carried out over a wide range of temperatures depending on the particular monomer and the particular acid employed; e.g., at temperatures between about —50 and about +100° C. The amount of acid employed in the reaction can vary to provide polymers having an acid equivalence of from as low as 0.005 to as high as 0.2 equivalents per 100 grams of polymer product.

The binder of liquid polymer containing acid groups is cured to a solid state with a polyaziridinyl compound. These curatives contain at least 2 aziridinyl groups per molecule, each aziridinyl group being represented by the formula

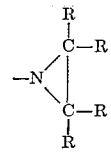

wherein each R can be hydrogen, alkyl, aryl, or cycloalkyl radicals or composites of these hydrocarbon radicals such as aralkyl, alkaryl, cycloalkylaryl, cycloalkylalkyl, arylcycloalkyl, alkylcycloalkyl and the like, and the total of said R groups contains up to 20 carbon atoms. Preferably each aziridinyl group as above-defined is attached to a carbon, phosphorus or sulfur atom in the compound and more than one aziridinyl group can be attached to the same carbon, phosphorus or sulfur. These carbon, phosphorus or sulfur atoms are in turn doubly bonded to another atom. The sulfur is attached to oxygen through a double bond and the carbon phosphorus is doubly bonded to an oxygen, sulfur or nitrogen atom. These carbon, phosphorus or sulfur atoms are also attached to another aziridinyl group and/or other atoms in the compound which can with the carbon or phosphorus form a cyclic compound, as for example, in the triazines and triphosphatriazines. In curing propellant compositions it is preferred that the aziridinyl group contain not more than one hydrocarbon substituent on each ring carbon. It is preferred, therefore, to employ as the curative tri(aziridinyl)phosphine oxides or sulfides, alone or in admixture with difunctional aziridinyl compounds.

The tri(aziridinyl)phosphine oxide and sulfides employed in the invention can be represented by the formula

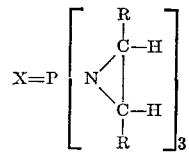

wherein X is selected from the group consisting of oxygen and sulfur, P is phosphorus, the R's are radicals containing up to a total of 20 carbon atoms selected from the group consisting of hydrogen, alkyl, cycloalkyl, aryl, alkaryl and aralkyl radicals and the R's can be unlike. Specific phosphine reactants which can be used include tri(1-aziridinyl)phosphine oxide;
tri(2-methyl-1-aziridinyl)phosphine oxide,
tri(2,3-dimethyl-1-aziridinyl)phosphine oxide,
tri(2-isopropyl-1-aziridinyl)phosphine oxide,
tri(2-methyl-3-ethyl-1-aziridinyl)phosphine oxide,
tri(2-isopropyl-1-aziridinyl)phosphine oxide,
tri(2-methyl-3-n-butyl-1-aziridinyl)phosphine oxide,
tri(2-hexyl-1-aziridinyl)phosphine oxide,
tri(2,3-diheptyl-1-aziridinyl)phosphine oxide,
tri(2-methyl-3-octyl-1-aziridinyl)phosphine oxide,
tri(2-ethyl-3-decyl-1-aziridinyl)phosphine oxide,
tri(2-dodecyl-1-aziridinyl)phosphine oxide,
tri(2-methyl-3-tridecyl-1-aziridinyl)phosphine oxide,
tri(2-ethyl-3-octadecyl-1-aziridinyl)phosphine oxide,
tri(2-eicosyl-1-aziridinyl)posphine oxide,
tri(2-methyl-3-cyclopentyl-1-aziridinyl)phosphine oxide,
tri(2-ethyl-3-cyclohexyl-1-aziridinyl)phosphine oxide,
tri[2-n-butyl-3-(4-methylcyclohexyl)1-aziridinyl]phosphine oxide,
tri(2-phenyl-1-aziridinyl)phosphine oxide,
tri(2-phenyl-3-tetraedcyl-1-aziridinyl)phosphine oxide,
tri(2,3-diphenyl-1-aziridinyl)phosphine oxide,
tri(2-tert-butyl-3-phenyl-1-aziridinyl)phosphine oxide,
tri[2-ethyl-3-(1-naphthyl)1-aziridinyl]phosphine oxide,
tri[2-n-propyl-3-(2-naphthyl)1-aziridinyl]phosphine oxide,
tri(2-methyl-3-benzyl-1-aziridinyl)phosphine oxide,
tri(2-nonyl-3-benzyl-1-aziridinyl)phosphine oxide,
tri[2-propyl-3-(2-naphthyl)1-azidinyl]phosphine oxide,
tri[2-methyl-3-(4-methylphenyl)1-aziridinyl]phosphine oxide,
tri[2-ethyl-3-(3-n-propylphenyl)1-aziridinyl]phosphine oxide,
tri[2-heptyl-3-(2,4-dimethylphenyl)1-aziridinyl] phosphine oxide,
tri(1-aziridinyl)phosphine sulfide,
tri(2-methyl-1-aziridinyl)phosphine sulfide,
tri(2,3-dimethyl-1-aziridinnyl)phosphine sulfide,
tri(2,3-diethyl-1-aziridinyl)phosphine sulfide,
tri(2-methyl-3-isopropyl-1-aziridinyl)phosphine sulfide,
tri(2-tert-butyl-1-aziridinyl)phosphine sulfide,
tri(2,3-didecyl-1-aziridinyl)phosphine sulfide,
tri(2-ethyl-3-pentadecyl-1-aziridinyl)phosphine sulfide,
tri(2-eicosyl-1-aziridinyl)phosphine sulfide,
tri(2-methyl-3-cyclohexyl-1-aziridinyl)phosphine sulfide,
tri(2-phenyl-1-aziridinyl)phosphine sulfide,
tri(2-phenyl-3-benzyl-1-aziridinyl)phosphine sulfide,
tri(2,3-diphenyl-1-aziridinyl)phosphine sulfide,
tri(2-ethyl-3-phenyl-1-aziridinyl)phosphine sulfide, and
tri(2-amyl-3-benzyl-1-aziridinyl)phosphine sulfide.

The difunctional aziridinyl compounds can be defined by the formula

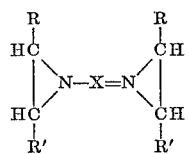

wherein X is selected from the group consisting of carbonyl, phenyl phosphoryl, phenyl thiophosphoryl, sulfoxyl or sulfonyl and each R and R' is hydrogen or an alkyl group containing from 1 to 4 carbon atoms. In the preferred species X is phenyl phosphoryl or sulfoxyl, R is hydrogen and R' is methyl. Examples of suitable difunctional aziridinyl compounds are:

phenyl-bis(2-methyl-1-aziridinyl)phosphine sulfide,
phenyl-bis(2-methyl-1-aziridinyl)-phosphine oxide,
phenyl-bis(2-ethyl-1-aziridinyl)-phosphine oxide,
phenyl-bis(2-methyl-3-ethyl-1-aziridinyl)-phosphine oxide,
phenyl-bis(2-butyl-1-aziridinyl)-phosphine oxide,
bis(2-methyl-1-aziridinyl) sulfoxide,
bis(2-propyl-1-aziridinyl) sulfoxide,
bis (2-methyl-3-propyl-1-aziridinyl) sulfoxide,
(2-methylaziridinyl-2-butyl-1-aziridinyl) sulfoxide,
bis (1-aziridinyl) sulfone,
bis (2-methyl-1-aziridinyl) sulfone,
bis (2-ethyl-1-aziridinyl) sulfone,
bis (2-propyl-1-aziridinyl) sulfone,
bis(2-ethyl-3-propyl-1-aziridinyl)sulfone,
(2-methylaziridinyl-2-ethyl-1-aziridinyl) sulfone,
bis(1,2-propylene)-1,3-urea,
bis(1,2-pentylene)-1,3-urea,
bis(4,5-octylene)-1,3-urea, and the like.

The amount of curative is preferably about stoichiometric to somewhat above stoichiometric, for example about 125 percent of the stoichiometric amount of curative based upon the acid equivalents of the polymer. With polymers in the lower range of equivalence, amounts up to 150 percent of stoichiometric can be employed and with polymers in the higher range of acid equivalence as low as 10 percent of stoichiometric amount of curative is effective. When using a curative of mixed functionality it is preferred that from 30 to 70 percent of the curing agent be the difunctional aziridinyl compound.

In preparing the propellant compositions the acid group-containing liquid polymer is admixed with the polyfunctional aziridinyl compound or compounds and with the inorganic oxidizing salt after which the mixture is increased in temperature so that a reaction occurs between the polymer and the aziridinyl compounds to provide a solid propellant structure. The polymer and curative are placed in a suitable dispersant-type mixer and thoroughly mixed for a period of 1 to 10 minutes, after which the oxidizer in a finely divided state, for example, in the range of about 1 to 300 microns, is added and mixing is continued for a period of 15 to 45 minutes under vacuum. The curative may be added after the oxidant. During the final mixing step the temperature is gradually increased to a temperature between about 100 to 300° F., preferably between about 150 and 200° F. The composition at this stage is a viscous slush which can then be poured into a rocket case or suitable mold. The filled mold is placed in an oven and cured for 24 to 48 hours or more at temperatures in the range of about 150 to 200° F.

In order to extend the pot-life of the composition after mixing and prior to curing, aniline or an alkyl derivative thereof as previously defined, is added to the polymeric binder, preferably in the first mixing step. This additive can be employed in a concentration of about 0.05 to about 1.0 weight percent, preferably about 0.1 to 0.6 percent based upon the binder constituents.

Examples of suitable pot-life extenders include aniline,
N-methylaniline,
N,N-dimethylaniline,
N-methyl-N-ethylaniline,
N,N-diethylaniline,
p-propylaniline,
N,N-dipropylaniline,
N,N-dimethyl-m-ethylaniline,
N,N-dipropyl-o-propylaniline,
ortho-meta- or para-toluidine,
3,5-dimethylaniline,
2-ethyl-5-propylaniline,
3,4,5-trimethylaniline,
N,N,2,3,4,5,6-heptamethylaniline,
N-ethyl-2,4-dimethyl-5,6-dipropylaniline, and the like.

To illustrate further the advantages of my invention the following examples are presented. The conditions and proportions in the examples are typical, and should not be construed to limit my invention unduly.

EXAMPLE I

Liquid polybutadiene containing terminal carboxyl groups was prepared by polymerizing butadiene in the presence of an initiator, which was a lithium adduct of methylnaphthylene, isoprene and butadiene, in a cyclohexane diluent and subsequently reacting the polymer with carbon dioxide. The lithium salt was then treated with anhydrous HCl and the lithium chloride was removed by filtration. A blend was prepared employing 70 percent of this carboxy terminated polymer and about 30 percent of a non-functional polybutadiene prepared over an initiator of n-butyllithium. The resultant polymer blend had a viscosity of 332 poise at a temperature of 77° F. and a carboxy content of 1.12 percent. The polymer blend was placed in a 1-quart sigma blade mixture and powdered ammonium perchlorate was added in increments. The mixing was continued for a period of approximately 10 minutes. A curative of tri(2-methyl-1-aziridinyl)phosphine oxide was then added (2.08 parts per 100 parts of polymeric material) and the mixing was continued for another 10 minutes. The relative proportions of the ingredients in parts by weight were as follows:

Binder: Parts
Polymer blend, parts _____ 19.59 } 20
Curative, parts _____ 0.41
Oxidant:
200 micron, parts _____ 56 } 80
18 micron, parts _____ 24

After molding the composition was cured at 160° F. for 96 hours. The pot-life of the curable composition and the physical characteristics of the solid propellant are given in Table I.

EXAMPLE II

A rocket propellant was prepared as in Example I except that 0.1 part by weight per 100 parts of the polymer of N,N-dimethylaniline was added to the binder and thoroughly mixed therewith prior to the addition of the powdered amomnium perchlorate. The pot-life and the properties of the cured propellant are given in Table I.

EXAMPLE III

A propellant was prepared as described in Example II except that 0.3 parts by weight of N,N-dimethylaniline was used per 100 parts of polymer.

EXAMPLE IV

A carboxy-terminated polybutadiene was prepared by polymerizing butadiene in the presence of a lithium-methylnaphthalene-isoprene-butadiene adduct and in a cyclohexane solvent, and thereafter treating the polymer with carbon dioxide and HCl as described in Example I. The recovered polymer had a viscosity of 496 poise at 77° F. and a carboxy content of 1.70 percent. This polymer was used in a propellant formulation using 20 parts by weight of binder with 80 parts by weight of ammonium perchlorate with the formulation mixed and cured as described in Example I. The curvative employed in the binder was 3.16 parts by weight of tri(2-methyl-1-aziridinyl)phosphine oxide per 100 parts by weight of the polymer. The results are reported in Table I.

EXAMPLE V

A propellant formulation was prepared as described in Example IV except that 0.3 parts by weight of N,N-dimethylaniline was added to 100 parts by weight of the polymer prior to incorporating the ammonium perchlorate.

EXAMPLE VI

A propellant was prepared as described in Example V except that 0.6 parts by weight of N,N-dimethylaniline was used per 100 parts by weight of polymer.

TABLE I

| Example number | N,N-dimethyl-aniline (phr.) | Pot-life (min.) | Temp., F. | $S_m$ (p.s.i.) | $S_b$ (p.s.i.) | $E_m$ (percent) | $E_b$ (percent) | Modulus (p.s.i.) |
|---|---|---|---|---|---|---|---|---|
| I | None | 77 | 170 | 84 | 77 | 11.9 | 14.6 | 1,000 |
|  |  |  | 75 | 139 | 121 | 18.3 | 22.6 | 1,200 |
|  |  |  | −40 | 385 | 348 | 25.0 | 30.9 | 4,200 |
|  |  |  | −70 | 574 | 526 | 17.8 | 20.5 | 7,400 |
| II | 0.1 | 118 | 170 | 71 | 65 | 21.8 | 26.1 | 440 |
|  |  |  | 75 | 124 | 112 | 33.4 | 40.7 | 540 |
|  |  |  | −40 | 334 | 317 | 52.0 | 58.0 | 1,800 |
|  |  |  | −70 | 485 | 470 | 43.6 | 46.8 | 3,800 |
| III | 0.3 | 155 | 170 | 75 | 67 | 22.8 | 28.2 | 440 |
|  |  |  | 75 | 132 | 120 | 36.2 | 42.4 | 570 |
|  |  |  | −40 | 348 | 328 | 52.8 | 59.5 | 1,900 |
|  |  |  | −70 | 488 | 475 | 43.8 | 45.1 | 4,000 |
| IV | None | 43 | 170 | 95 | 87 | 12.9 | 16.4 | 1,000 |
|  |  |  | 75 | 154 | 138 | 19.1 | 21.8 | 1,200 |
|  |  |  | −40 | 416 | 380 | 25.6 | 29.6 | 3,600 |
|  |  |  | −70 | 452 | 416 | 18.4 | 23.5 | 5,000 |
| V | 0.3 | 67 | 170 | 99 | 91 | 13.8 | 16.3 | 950 |
|  |  |  | 75 | 161 | 147 | 21.1 | 24.7 | 1,100 |
|  |  |  | −40 | 432 | 407 | 27.4 | 30.9 | 3,800 |
|  |  |  | −70 | 638 | 579 | 18.3 | 23.2 | 6,900 |
| VI | 0.6 | 80 | 170 | 103 | 97 | 15.0 | 16.8 | 900 |
|  |  |  | 75 | 167 | 154 | 22.6 | 26.2 | 1,100 |
|  |  |  | −40 | 440 | 411 | 29.2 | 33.5 | 3,400 |
|  |  |  | −70 | 632 | 584 | 18.8 | 22.3 | 6,500 |

NOTE.—$S_m$=stress at yield, $S_b$=stress at break, $E_m$=elongation at yield, $E_b$=elongation at break, modulus=Young's modulus.

As can be seen from the above data the addition of N,N-dimethylaniline resulted in a definite and useful increase in pot-life of the propellant compositions. The data also show that some improvement in physical properties of the cured propellant result. For example, in the formulations of the Examples I–III there was substantial increase in low temperature elongation of the cured polymer with very little decrease in the high temperature tensile strength. In the formulations of Example IV–VI employing the polymeric binder of higher functionality some improvement in tensile strength over the full temperature range is indicated with no appreciable alteration of elongation properties.

As will be evident to those skilled in the art from the above description, various modification can be made in my invention without departing from the spirit or scope thereof.

I claim:

1. A castable composition curable to form a solid propellant comprising an oxidant of inorganic oxidizing salt, a binder of synthetic polymer of vinylidene-containing monomer selected from the group consisting of conjugated dienes, vinyl-substituted aromatic compounds, acrylic acid esters, alkylacrylic acid esters, nitriles, N,N-disubstituted amides, vinylfuran and N-vinylcarbazole, said polymer containing at least 1 acid group per molecule, a curative containing at least two aziridinyl groups having the formula

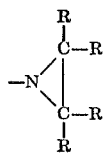

wherein each R is selected from the group consisting of hydrogen, alkyl, cycloalkyl, and aryl radicals and compositions thereof, the total of said R groups containing up to 20 carbon atoms, said curative being selected from the group consisting of triazines, triphosphatriazines, tri-(aziridinyl)phosphine oxides, tri(aziridinyl)phosphine sulfides, and compounds containing two of said aziridinyl groups attached to a bivalent radical selected from the group consisting of carbonyl, phenyl phosphoryl, phenyl thiophosphoryl, sulfoxyl and sulfonyl, and from 0.05 to 1.0 weight percent based on said binder of a pot-life extender having the formula

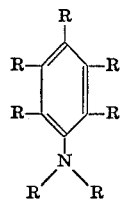

wherein each R is selected from the group consisting of hydrogen and lower alkyls.

2. The composition of claim 1 wherein said polymer is a liquid polymer containing 1 to 4 of said acid groups terminally positioned on the molecule.

3. The composition of claim 1 wherein said polymer is a copolymer of a conjugated diene with an unsaturated carboxylic acid having a maximum of 36 carbon atoms, from 1 to 4 double bonds and from 1 to 2 carboxy groups per molecule.

4. A castable composition curable to form a solid propellant comprising an oxidant of inorganic oxidizing salt, a binder of liquid, conjugated diene polymer containing per molecule at least 1 acid group of the elements of Groups IV-B, V-B, and VI-B of the Periodic System, a curative containing at least 2 aziridinyl groups having the formula

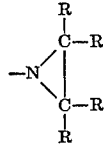

wherein each R is selected from the group consisting of hydrogen, alkyl, cycloalkyl, and aryl radicals and composites thereof, the total of said R groups containing up to 20 carbon atoms, said curative being selected from the group consisting of triazines, triphosphatriazines, tri-(aziridinyl)phosphine oxides, tri(aziridinyl)phosphine sulfides, and compounds containing two of said aziridinyl groups attached to a bivalent radical selected from the group consisting of carbonyl, phenyl phosphoryl, phenyl thiophosphoryl, sulfoxyl and sulfonyl, and as a pot-life extender from 0.05 to 1.0 weight percent based on said binder of a material having the formula

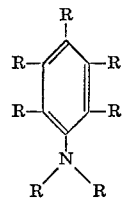

wherein each R is selected from the group consisting of hydrogen and lower alkyls.

5. The composition of claim 4 wherein said polymer is polybutadiene containing terminal carboxy groups, said curative is tri(2-methyl-1-aziridinyl)phosphine oxide and said material is N,N-dimethylaniline.

6. A solid propellant prepared by heating the composition of claim 1.

7. A solid propellant prepared by heating the composition of claim 5.

8. A method of extending the pot-life of a castable composition curable to form a solid propellant comprising an oxidant of inorganic oxidizing salt, a binder of synthetic polymer of vinylidene-containing monomer selected from the group consisting of conjugated dienes, vinyl-substituted aromatic compounds, acrylic acid esters, alkylacrylic acid esters, nitriles, N,N-disubstituted amides, vinylfuran and N-vinylcarbazole, said polymer containing at least 1 acid group per molecule, and a curative containing at least two aziridinyl groups having the formula

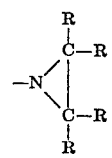

wherein each R is selected from the group consisting of hydrogen, alkyl, cycloalkyl, and aryl radicals and compositions thereof, the total of said R groups containing up to 20 carbon atoms, said curative being selected from the group consisting of triazines, triphosphatriazines, tri (aziridinyl)phosphine oxides, tri(aziridinyl)phosphine sulfides, and compounds containing two of said aziridinyl groups attached to a bivalent radical selected from the group consisting of carbonyl, phenyl phosphoryl, phenyl thiophosphoryl, sulfoxyl and sulfonyl, which comprises adding to said binder from 0.05 to 1.0 weight percent based on said binder of a material having the formula

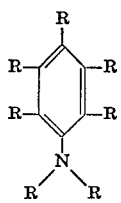

wherein each R is selected from the group consisting of hydrogen and lower alkyls.

9. A method of extending the pot-life of a castable composition curable to form a solid propellant comprising an oxidant of inorganic oxidizing salt, a binder of liquid, conjugated diene polymer containing per molecule at least 1 acid group of the elements of Groups IV-B, V-B, and VI-B of the Periodic System, and a curative containing at least 2 aziridinyl groups having the formula

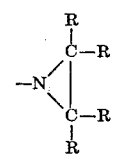

wherein each R is selected from the group consisting of hydrogen, alkyl, cycloalkyl, and aryl radicals and composites thereof, the total of said R groups containing up to 20 carbon atoms, said curative being selected from the group consisting of triazines, triphosphatriazines, tri(aziridinyl)phosphine oxides, tri(aziridinyl)phosphine sulfides, and compounds containing two of said aziridinyl groups attached to a bivalent radical selected from the group consisting of carbonyl, phenyl phosphoryl, phenyl thiophosphoryl, sulfoxyl and sulfonyl, which comprises adding to said binder from 0.05 to 1.0 weight percent based on said binder of a material having the formula

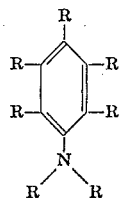

wherein each R is selected from the group consisting of hydrogen and lower alkyls.

10. The method of claim 9 wherein said polymer is polybutadiene containing terminal carboxy groups, said curative is tri(2-methyl-1-aziridinyl)phosphine oxide and said material is N,N-dimethylaniline.

11. The method of claim 9 wherein said polymer is a copolymer of 1,3-butadiene and acrylic acid, said curative is tri(2-methyl-1-aziridinyl)phosphine oxide and said material is N,N-dimethylaniline.

References Cited
UNITED STATES PATENTS

| | | | |
|---|---|---|---|
| 3,087,844 | 4/1963 | Hudson et al. | 149—19 |
| 3,147,161 | 9/1964 | Abere et al. | 149—19 |
| 3,257,248 | 6/1966 | Short et al. | 149—19 |

OTHER REFERENCES

Chem. and Eng. News, Aug. 1, 1960, p. 35.

CARL D. QUARFORTH, Primary Examiner

E. A. MILLER, Assistant Examiner

U.S. Cl. X.R.

149—20, 44